(12) United States Patent
Winter

(10) Patent No.: US 8,710,998 B2
(45) Date of Patent: Apr. 29, 2014

(54) METHOD AND LASER RECEIVER FOR ACOUSTICALLY INDICATING A LASER BEAM

(75) Inventor: Andreas Winter, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 180 days.

(21) Appl. No.: 13/135,145

(22) Filed: Jun. 27, 2011

(65) Prior Publication Data

US 2011/0316714 A1    Dec. 29, 2011

(30) Foreign Application Priority Data

Jun. 28, 2010   (DE) .......................... 10 2010 030 597

(51) Int. Cl.
*G08B 21/00*   (2006.01)

(52) U.S. Cl.
USPC .................................... 340/686.2; 340/686.1

(58) Field of Classification Search
USPC ...................................................... 340/686.2
See application file for complete search history.

(56) References Cited

U.S. PATENT DOCUMENTS

| | | | |
|---|---|---|---|
| 4,494,870 A * | 1/1985 | Hentschel et al. ......... | 356/152.3 |
| 5,182,863 A * | 2/1993 | Rando .............................. | 33/227 |
| 5,287,627 A * | 2/1994 | Rando .............................. | 33/227 |
| 5,530,256 A * | 6/1996 | Mizutani et al. ............... | 250/557 |

\* cited by examiner

*Primary Examiner* — Travis Hunnings
(74) *Attorney, Agent, or Firm* — Davidson, Davidson & Kappel, LLC

(57) ABSTRACT

A laser receiver (1) for acoustically indicating a laser beam, including a housing (4), a detector unit (6) that ascertains the actual position (2) of the laser beam, an evaluation unit (8) that determines the difference between the actual position (2) and the target position (3), and an acoustic indication device (7) that uses an acoustic signal to indicate whether the actual position (2) of the laser beam is above, below or at the target position (3), wherein a control unit (9) is provided that, as a function of the difference between the actual position (2) and the target position (3), generates a scanning signal to modulate a basic signal, and then sends the scanning signal to the acoustic indication device (7).

7 Claims, 3 Drawing Sheets

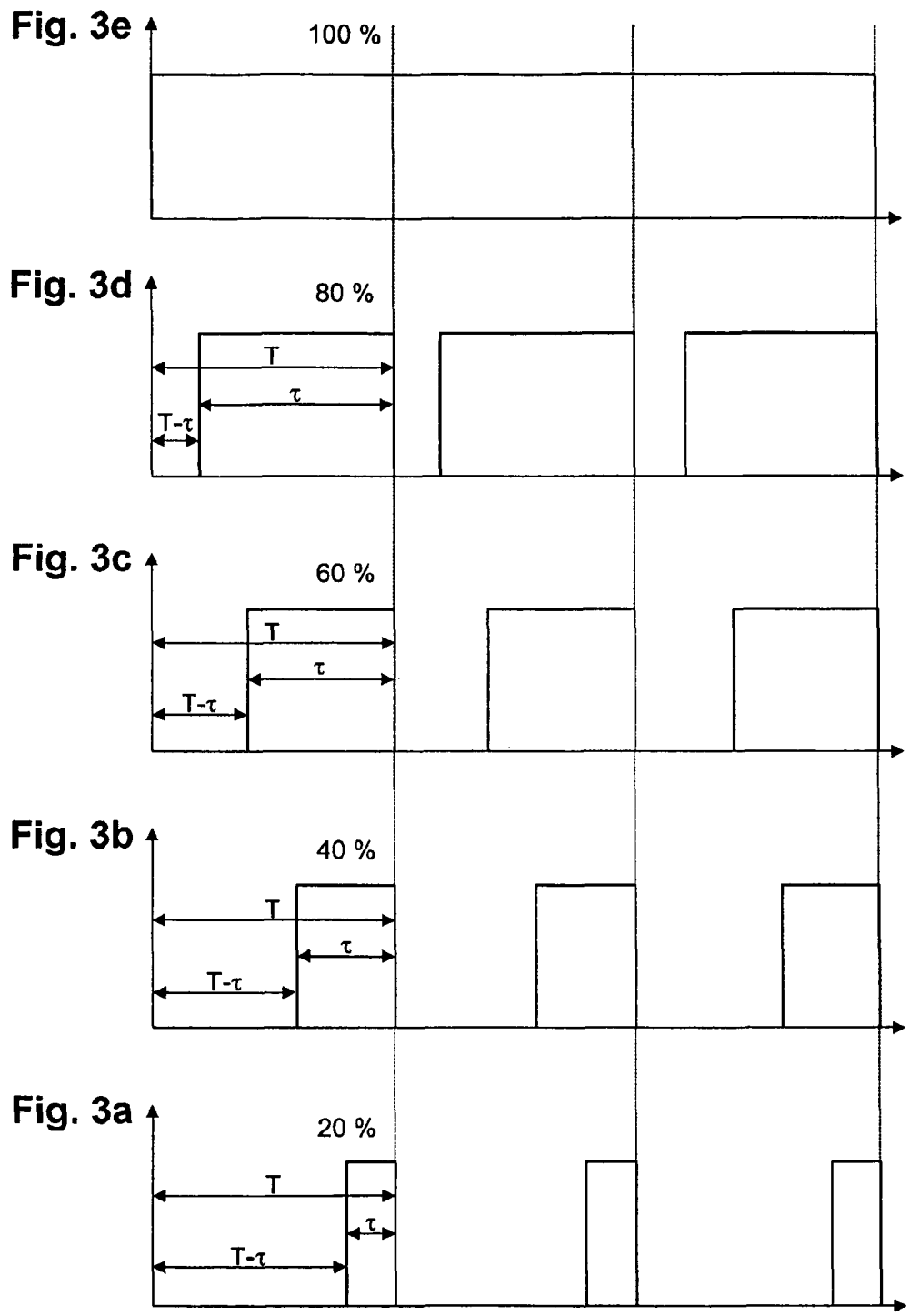

180# METHOD AND LASER RECEIVER FOR ACOUSTICALLY INDICATING A LASER BEAM

This claims the benefit of German Patent Application DE 10 2010 030 597.9, filed Jun. 28, 2010 and hereby incorporated by reference herein.

The present invention relates to a method for acoustically indicating a laser beam as well as to a laser receiver for acoustically indicating a laser beam.

BACKGROUND

For purposes of carrying out leveling and marking work indoors as well as outdoors, laser devices are known that generate punctiform and/or linear laser beams. The laser beams serve to show reference points or reference lines on walls, ceilings and floors. When it comes to such laser devices, a distinction is made between rotation lasers, which generate a linear laser beam by rotating a source of laser beams or a beam-deflecting lens system around an axis of rotation, and punctiform and/or linear lasers, which generate punctiform and/or linear laser beams by means of beam-forming lens systems such as cylindrical lenses and prisms.

In order to project a laser beam onto a wall at a certain height, the laser device has to be positioned at the appropriate height. Holders are generally known with which laser devices can be fastened to a wall, to a wall-mounted rail or a ceiling-mounted rail, to a pipe and/or to a magnetic structure, as well as holders in the form of tripods that can be positioned free-standing on a substrate. The height of the holders is adjusted manually by means of a crank or else by a motor.

The maximum permissible laser output is limited in the case of laser devices that can be used without protective equipment such as goggles. When leveling and marking work is performed outdoors, the permissible laser outputs often yield laser beams that are hardly or not at all visible. In order to improve the visibility of laser beams, laser receivers are held in the laser beam. Laser receivers, as handheld devices, are held by an operator directly in the laser beam or else they are attached to a telescopic or leveling rod. The known laser receivers comprise a detector unit, an evaluation unit as well as optical display devices and acoustic indication devices.

In order to set the holder at a desired height, which is designated as the target position, a laser beam is directed at a detector unit of the laser receiver. By means of an evaluation unit, the difference between the actual position of the laser beam and the target position is calculated and then displayed optically and/or indicated acoustically by the laser receiver. The operator controls the holder by means of an operating unit until the laser beam is located in the target position.

The optical display device comprises an LCD display on which the height difference of the laser beam with respect to the target position is displayed in the form of graphic symbols using distance arrows and a center bar, and/or as a numerical value. The distance arrows have several stages of increasing or decreasing width in order to display the height difference of the laser beam with respect to the target position. The distance arrows increase when the height difference of the laser beam with respect to the target position increases, and they decrease when the height difference decreases.

The acoustic indication device comprises a loudspeaker that emits three different acoustic signals. If the laser beam is at the target position, a continuous tone sounds at a constant tone frequency. If the detector unit detects the laser beam above the target position, an acoustic signal sounds at the tone frequency that is modulated with a scanning signal having a first scanning frequency $f_{T1}$. If the detector unit detects the laser beam below the target position, an acoustic signal sounds at the tone frequency that is modulated with a scanning signal having a second scanning frequency $f_{T2}$. The second scanning frequency $f_{T2}$ is lower than the first scanning frequency $f_{T1}$.

SUMMARY OF THE INVENTION

The prior art laser receivers have the drawback that the distance arrows that optically show the operator how far and in which direction he has to move the laser receiver are poorly visible in certain ambient conditions, and that the acoustic indication only distinguishes between three states, namely, below the target position, at the target position and above the target position. The acoustic signals do not provide the operator with any information about how far the actual position of the laser beam is from the target position.

It would be desirable to improve a method and a laser receiver for acoustically indicating a laser beam with respect to the above-mentioned drawbacks when the visibility is limited.

It is an object of the present invention to provide a method for acoustically indicating a laser beam that helps the user to set the height in the case of limited visibility. It is also an object of the invention to provide an appertaining laser receiver for acoustically indicating a laser beam.

The present invention provides a method for acoustically indicating a laser beam in which a basic signal is modulated with a scanning signal, and the scanning signal is changed as a function of the difference between the actual position and the target position. Since the scanning signal is changed as a function of the difference between the target position and the actual position, the operator receives acoustic information as to how the laser receiver should be moved.

In a preferred embodiment, the scanning ratio and/or the scanning frequency of the scanning signal is changed as a function of the difference between the target position and the actual position. The scanning ratio and the scanning frequency are suitable for providing an acoustic indication since changes in these properties can be clearly heard by the operator. The audibility can be improved in that several properties of the scanning signal are changed simultaneously as a function of the difference.

The scanning ratio and/or the scanning frequency of the scanning signal are changed, especially preferably continuously or in several discrete stages, as a function of the difference between the actual position and the target position. The advantage of a continuous change of the scanning signal is that the operator receives very precise acoustic instructions as to how the laser receiver should be adjusted. An acoustic indication in several discrete stages lends itself when an optical display is provided in addition to an acoustic indication, so that the acoustic indication and the optical display are harmonized with each other.

The scanning ratio of the scanning signal is especially preferably decreased as the difference between the actual position and the target position increases, and it is increased as the difference between the actual position and the target position decreases. Here, the change can take place, for instance, logarithmically or linearly as a function of the difference.

According to the invention, a laser receiver for acoustically indicating a laser beam is provided with a control unit that, as a function of the difference between the actual position and the target position, generates a scanning signal to modulate a basic signal, and then sends this scanning signal to the acoustic indication device. Since the scanning signal is dependent on the difference between the actual position and the target position, the operator receives acoustic instructions as to how to move the laser receiver. The changes in the acoustic signals show the operator in which direction the laser receiver or the laser device has to be moved.

Preferably, the acoustic indication device is arranged in the housing and/or outside of the housing. The advantage of an acoustic indication device that is located outside of the housing is that the acoustic indication occurs at the place where it can be clearly heard by the operator. Moreover, the performance of the acoustic indication device can be adapted to the local circumstances.

In a preferred embodiment, the acoustic indication device has an electric signal generator, a first electro-acoustic sonic converter and a second electro-acoustic sonic converter, said signal generator and the first sonic converter being arranged in the housing, while the second sonic converter can be connected to the signal converter via a communication connection. The advantage of a second sonic converter, which can be connected to the signal generator via a wired or wireless communication connection, is that the acoustic indication can be transmitted to a remote location. By means of a headset, the acoustic indication can be heard very clearly, even under very noisy ambient conditions. Moreover, the possibility exists for several operators to hear the acoustic indication very clearly at different locations.

In an alternative preferred embodiment, the acoustic indication device is provided in the housing while another acoustic indication device is provided outside of the housing, said other acoustic indication device being connected to a microcontroller of the laser receiver via a communication connection.

Preferably, the laser receiver has a connector to connect a sonic converter or an acoustic indication device via a wired or wireless communication connection. Acoustic indication devices such as loudspeakers or headsets can be connected to the laser receiver via the external connector. The laser receiver can be configured to be compact if high-performance and thus usually large acoustic indication devices can be connected via the external connector.

Preferably, the laser receiver has a switching unit to switch over the acoustic indication between a first acoustic indication device, a second acoustic indication device, or a first and a second acoustic indication device, or between a first sonic converter, a second sonic converter, or a first and a second sonic converter. The switching unit offers the possibility of adapting the acoustic indication to the ambient conditions. Switching off sonic converters, signal generators or acoustic indication devices that are not needed reduces noise and the power consumption of the laser receiver.

Embodiments of the invention will be explained below on the basis of the drawing. The drawing does not necessarily depict the embodiments true-to-scale, but rather, it is presented in schematic and/or slightly distorted form whenever necessary for the sake of clarity. Regarding additions to the teaching that can be derived directly from the drawing, reference is hereby made to the pertinent state of the art. In this context, it should be taken into consideration that many modifications and changes can be made in terms of the form and the details of a given embodiment, without departing from the general idea of the invention. The features of the invention disclosed in the description, in the drawing as well as in the claims, be it individually or in any desired combination, can all be essential for refining the invention. Moreover, all combinations of at least two of the features disclosed in the description, in the drawing and/or in the claims fall within the scope of the invention. The general idea of the invention is not limited to the exact form or details of the preferred embodiment shown and described below, nor is it limited to an object that would be restricted in comparison to the object claimed in the claims. Regarding the dimensional ranges given, values that are within the cited limits can also be disclosed as limit values and can be employed and claimed as desired. For the sake of simplicity, the same reference numerals will be used below for identical or similar parts or for parts having an identical or similar function.

BRIEF DESCRIPTION OF THE DRAWINGS

Other advantages, features and details of the invention ensue from the description below of preferred embodiments as well as from the drawing.

The following is shown:

FIGS. 3a-e five different acoustic signals in case of a stagewise indication of the laser beam.

DETAILED DESCRIPTION

Figure 1:
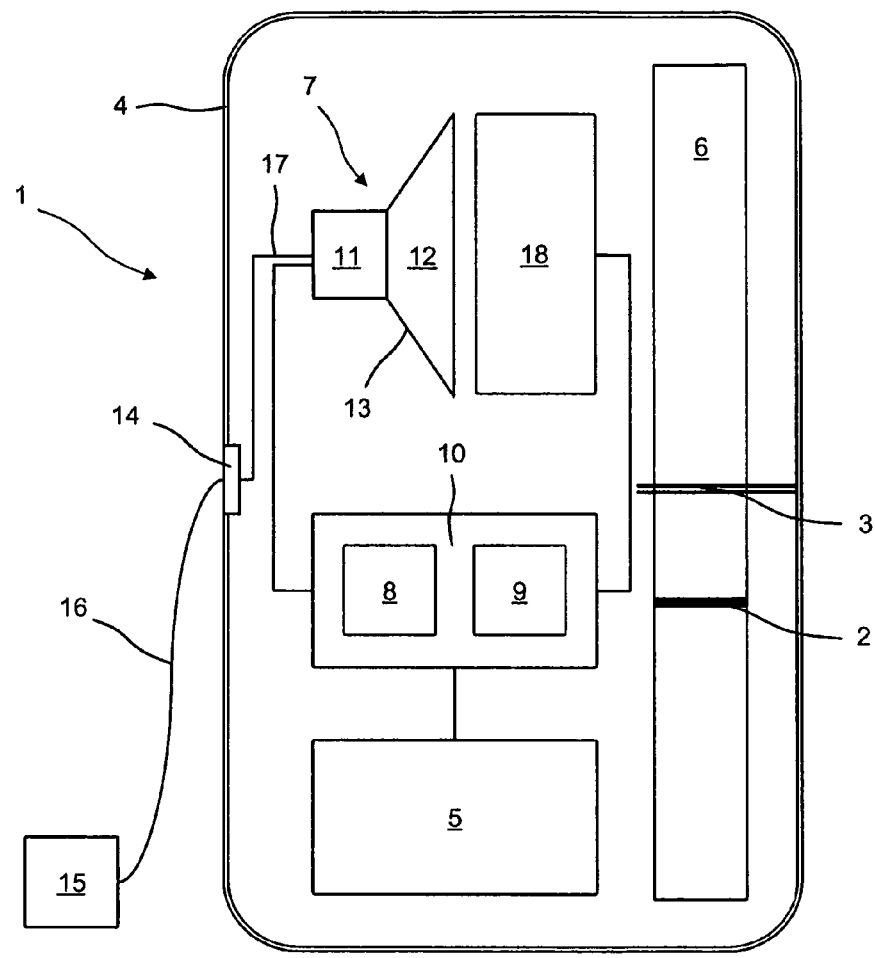
FIG. 1 a first embodiment of a laser receiver according to the invention for acoustically indicating the difference between an actual position of a laser beam and a target position.

FIG. 1 shows a laser receiver 1 according to the invention for acoustically indicating the difference between an actual position 2 of a laser beam and a target position 3. The laser receiver 1 includes a housing 4, an operating unit 5 for operating the laser receiver 1, a detector unit 6 for detecting the actual position 2 of the laser beam and an acoustic indication device 7. The operating unit 5, the detector unit 6 and the acoustic indication device 7 are all integrated into the housing 4 of the laser receiver 1.

The detector unit 6 and the indication device 7 are connected to an evaluation unit 8 that determines the difference between the actual position 2 of the laser beam and the target position 3. The evaluation unit 8 is integrated into a microcontroller 10, together with a control unit 9 that serves to control the laser receiver 1. The target position 3 is stored in the microcontroller 10. The objective is to move the laser receiver 1 in such a way that the laser beam in the target position 3 strikes the detector unit 6.

The acoustic indication device 7 has an electric signal generator 11 that is connected to the microcontroller 10, and an electro-acoustic sonic converter 12. The signal generator 11 generates an electric signal that corresponds to the difference, said electric signal being converted into an acoustic signal by the sonic converter 12. The electric signal generator 11 and the electro-acoustic sonic converter 12 are configured as loudspeakers 13 and are arranged in the housing 4 of the laser receiver 1. The loudspeaker 13 is configured so that it can be switched on and off, and it indicates the difference between the actual position and the target position as an acoustic signal. The volume of the loudspeaker 13 can be selected between several stages, for example, between loud, normal, soft and silent.

The laser receiver 1 according to the invention has a connector 14 for a second electro-acoustic sonic converter 15. The second electro-acoustic sonic converter 15 is located outside of the housing 4 of the laser receiver 1 and it can be connected to the laser receiver 1 via a communication connection 16. The connector 14 is connected to the electric signal generator 11 via a connection 17. The communication connection 16 is configured as a wired communication connection or as a wireless communication connection, for example, in the form of a radio or infrared connection. The second electro-acoustic sonic converter 15 transmits the acoustic signals to a remote location, so that the acoustic signals can be clearly heard there. Headsets or another loudspeaker, for instance, are suitable as sonic converters 15.

As an alternative to the arrangement in the housing shown in FIG. 1, the acoustic indication device 7 can also be located outside of the housing 4. In this case, the acoustic indication device 7 is connected to the connector 14 via the communication connection 16. The connector 14, in turn, is connected to the microcontroller 10.

The laser receiver 1 has an optical display 18 where the operator can read information about the laser receiver 1. This includes, for instance, the charge status of the laser receiver 1 and the volume set for the loudspeaker 15. The optical display 18 does not serve to optically display the laser beam and the difference between the actual position 2 of the laser beam and the target position 3.

Figure 2:
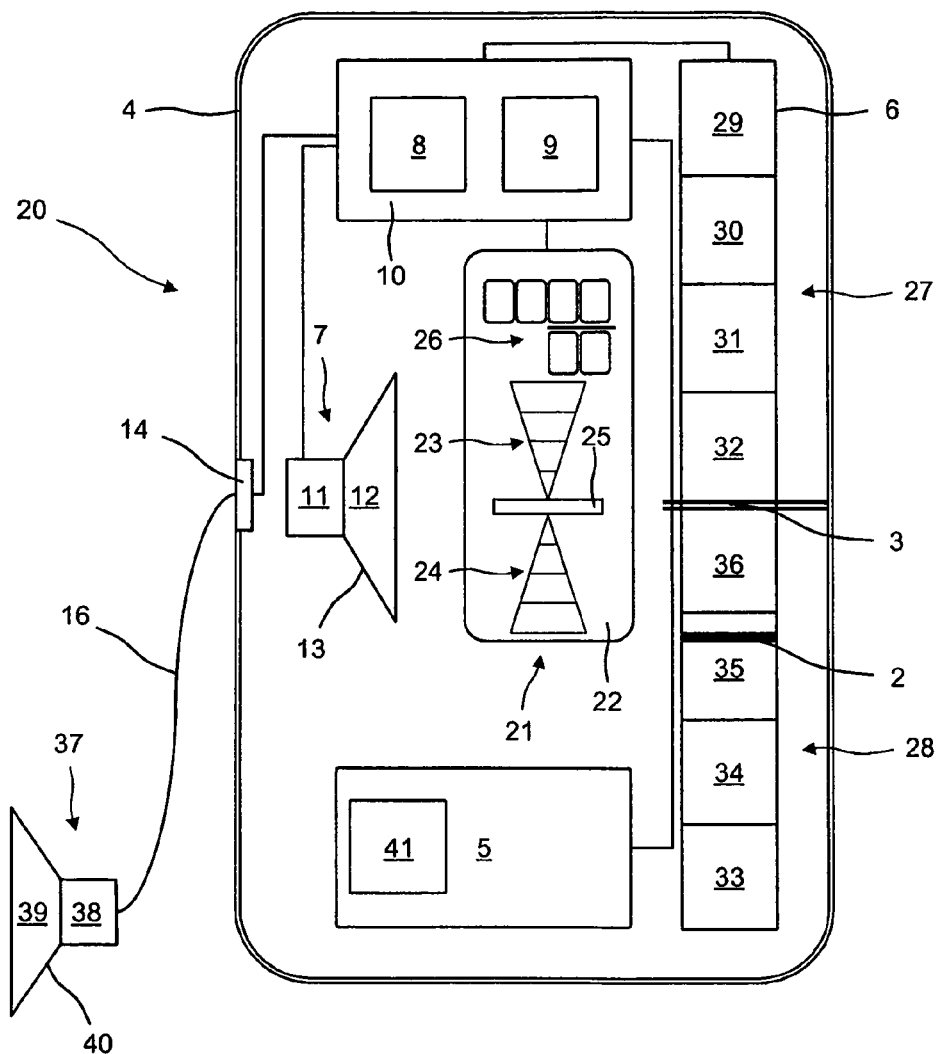
FIG. 2 a second embodiment of a laser receiver according to the invention for acoustically indicating and optically displaying the difference between the actual position and the target position.

FIG. 2 shows a second embodiment of a laser receiver 20 according to the invention for acoustically indicating and optically displaying the difference between the actual position 2 and the target position 3. The laser receiver 20 differs from the laser receiver 1 of FIG. 1 in that, in addition to the acoustic indication, the difference is also displayed optically. For this purpose, in addition to the acoustic indication device 7, the laser receiver also has an optical display device 21 that optically displays the difference and that is integrated into the laser receiver 1.

The difference between the actual position 2 of the laser beam and the target position 3 is indicated acoustically and displayed optically to the operator in discrete stages The optical display device 21 comprises an LCD display 22 that depicts the difference in the form of graphic symbols using an upper distance arrow 23 and a lower distance arrow 24 and a center bar 25, and in the form of a numerical value 26 shown in a selected unit of measurement. The upper distance arrow 23 indicates that the laser beam is above the target position 3, while the lower distance arrow 24 indicates that the laser beam is below the target position 3. The center bar 25 lights up when the laser beam is at the target position 3.

The distance arrows 23, 24 each have four stages that are configured so as to be equidistant. Each stage corresponds to a range of the differences. The detector unit 6 is divided into an upper detector unit 27 and a lower detector unit 28. In the embodiment of FIG. 2, the upper detector unit 27 comprises four upper detector fields 29, 30, 31, 32 while the lower detector unit 28 comprises four lower detector fields 33, 34, 35, 36. The stages of the upper distance arrow 23 correspond to the upper detector fields 29-32, while the stages of the detector unit 24 correspond to the lower detector fields 33-36.

The operator receives not only the optical display of the differences via the optical display device 21 but also, via the acoustic indication device 7, acoustic instructions for moving the laser receiver 1. The differences between the actual position 2 of the laser beam and the target position 3 are acoustically indicated by means of acoustic signals. The differences are indicated by changes in the acoustic properties. The scanning ratio, the volume and the tone frequency are all suitable as properties since changes in these properties can be clearly heard by the operator. The audibility can be improved in that several properties of the scanning signal are changed simultaneously as a function of the difference.

The laser receiver 20 not only has the acoustic indication device 7, which is located in the housing 4, but also another acoustic indication device 37, including an electric signal generator 38 and an electro-acoustic sonic converter 39. The electric signal generator 38 and the electro-acoustic sonic converter 39 are configured as loudspeakers 40 and are located outside of the housing 4 of the laser receiver 20. The loudspeaker 40 is connected to the connector 14 via the communication connection 16. The acoustic indication of the height difference of the laser beam can be configured so that it can be switched over between the first and/or the second indication device 7, 37 by means of a switching unit 41.

The acoustic indication of the actual position 2 relative to the target position 3 is done by means of an acoustic signal that is generated through the modulation of a basic signal with a scanning signal. For example, a rectangular signal having a frequency within the frequency range between 1 kHz and 5 kHz is employed as the basic signal. The scanning signal is characterized by a scanning frequency that is defined as a mathematical reciprocal value of a period T, and by a scanning ratio that is defined as the ratio of the pulse duration $\tau$ to the period T. No acoustic signal sounds if the laser beam is outside of the detector unit 6. An acoustic signal only sounds if the laser beam has struck the detector unit 6.

FIGS. 3a-3e show five acoustic signals that help the operator during the setting of the height of the laser receiver 1. The basic signal is configured as a rectangular signal having a frequency within the frequency range between 1 kHz and 5 kHz that is modulated with a rectangular scanning signal. Alternatively, the scanning signal can be configured with a triangular, sinusoidal or any other shape. The distinction as to whether the laser beam strikes the detector unit 6 above or below the target position 3 is indicated to the operator, for instance, by means of different basic signals that differ in their tone frequency or in their signal form, or else by means of different scanning frequencies of the scanning signals.

The acoustic signal of FIG. 3a sounds when the actual position 2 of the laser beam is in the lower detector field 33. The scanning ratio $\tau/T$ of the scanning signal is 20%, that is to say, the pulse pause T-$\tau$ is four times longer than the pulse duration $\tau$. The short pulse duration $\tau$ and the long pulse pause T-$\tau$ indicate to the operator that the difference between the actual position 2 and the target position 3 is large.

If the laser receiver 1 is moved by the operator on the basis of the acoustic instructions received, the laser beam strikes the lower detector field 34 and the acoustic signal of FIG. 3b sounds. The scanning ratio $\tau/T$ of the scanning signal is 40%. The pulse duration $\tau$ that is longer than the acoustic signal from FIG. 3a as well as the shorter pulse pause T-$\tau$ indicate to the operator that the difference between the actual position 2 and the target position 3 has become smaller but that the laser receiver 1 still has to be moved further.

If the operator moves the laser receiver 1 on the basis of the acoustic instructions received, the laser beam first strikes the lower detector field 35 that is acoustically indicated by the acoustic signal from FIG. 3c at which the scanning signal has a scanning ratio of $\tau/T$ of 60%. When the laser receiver 1 is moved further, the laser beam strikes the lower detector field 36, sounding the acoustic signal from FIG. 3d at which the scanning signal has a scanning ratio $\tau/T$ of 80%. The pulse duration $\tau$ that is longer than the acoustic signal from FIG. 3c as well as the shorter pulse pause T-$\tau$ indicate to the operator that the difference has become even smaller but that the laser receiver 1 still has to be moved further.

If the laser receiver 1 is moved further by the operator, the laser beam strikes the area between the upper and lower detector units 27, 28 and the acoustic signal from FIG. 3e sounds. The scanning ratio τ/T is 100%, that is to say, the operator hears a continuous tone without a pulse pause. The continuous tone indicates to the operator that the laser beam is striking the detector unit 6 in the target position 3 and is oriented correctly. In order to make it even clearer acoustically to the operator that the target position 3 has been reached, the basic signal from FIG. 3e can differ from the basic signals from FIGS. 3a-3d, for example, in terms of its tone frequency.

The acoustic indication of the difference between the actual position 2 and the target position 3 in the configuration from FIG. 2, like the optical display, takes place in several discrete stages. Alternatively, the acoustic indication can also be continuous as a function of the difference. For this purpose, for instance, the scanning ratio of the scanning signal is changed linearly or logarithmically with the difference between the actual position 2 and the target position 3.

What is claimed is:

1. A method for acoustically indicating a laser beam, the laser beam being received in an actual position on a detector, the method comprising:
   determining a difference between the actual position and a target position using an evaluation unit; and
   employing an acoustic indicator to indicate whether the actual position of the laser beam is above, below or at the target position, a basic signal being modulated with a scanning signal, the scanning signal being changed as a function of the difference between the actual position and the target position;
   wherein a scanning ratio and/or scanning frequency of the scanning signal is changed as a function of the difference between the actual position and the target position.

2. A method for acoustically indicating a laser beam, the laser beam being received in an actual position on a detector, the method comprising:
   determining a difference between the actual position and a target position using an evaluation unit; and
   employing an acoustic indicator to indicate whether the actual position of the laser beam is above, below or at the target position, a basic signal being modulated with a scanning signal, the scanning signal being changed as a function of the difference between the actual position and the target position, wherein a scanning ratio and/or scanning frequency of the scanning signal is changed as a function of the difference between the actual position and the target position,
   wherein the scanning ratio and/or the scanning frequency of the scanning signal are changed continuously or in several discrete stages, as a function of the difference between the actual position and the target position.

3. The method as recited in claim 1 wherein the scanning ratio of the scanning signal is decreased as the difference between the actual position and the target position increases, and is increased as the difference between the actual position and the target position decreases.

4. A laser receiver for acoustically indicating a laser beam, comprising:
   a housing;
   a detector ascertaining an actual position of the laser beam;
   an evaluator determining a difference between the actual position and a target position; and
   an acoustic indicator using an acoustic signal to indicate whether the actual position of the laser beam is above, below or at the target position; and
   a controller generating, as a function of the difference between the actual position and the target position, a scanning signal to modulate a basic signal, and sending the scanning signal to the acoustic indicator;
   wherein the acoustic indicator has an electric signal generator, a first electro-acoustic sonic converter and a second electro-acoustic sonic converter, the signal generator and the first sonic converter being arranged in the housing, the second sonic converter connectable to the signal generator via a communication connection.

5. The laser receiver as recited in claim 4 wherein the acoustic indicator is arranged in the housing and/or outside of the housing.

6. The laser receiver as recited in claim 4 further comprising a connector to connect the second electro-acoustic sonic converter or another acoustic indicator.

7. The laser receiver as recited in claim 4 wherein the laser receiver has a switch to switch acoustic indication between the acoustic indicator and a second acoustic indicator or to both the acoustic indicator and the second acoustic indicator, or between the first sonic converter and the second sonic converter or to both the first and second sonic converters.

* * * * *